United States Patent
Huberman et al.

(10) Patent No.: US 8,531,551 B2
(45) Date of Patent: Sep. 10, 2013

(54) SYSTEM AND METHOD FOR IMAGE SHARING

(75) Inventors: Bernardo Huberman, Palo Alto, CA (US); Rich Gossweiler, Santa Clara, CA (US); Joshua Rogers Tyler, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2570 days.

(21) Appl. No.: 10/971,613

(22) Filed: Oct. 21, 2004

(65) Prior Publication Data

US 2006/0087559 A1 Apr. 27, 2006

(51) Int. Cl.
    *H04N 5/76* (2006.01)

(52) U.S. Cl.
    USPC ..................... 348/231.2; 348/231.3

(58) Field of Classification Search
    USPC ............. 348/231.3, 231.99, 231.2; 358/1.15, 358/1.16, 317; 455/414.1, 420, 463
    See application file for complete search history.

(56) References Cited

U.S. PATENT DOCUMENTS

| 6,035,323 | A  | * | 3/2000 | Narayen et al. | 709/201 |
| 6,167,469 | A  | * | 12/2000 | Safai et al. | 710/62 |
| 6,583,799 | B1 | * | 6/2003 | Manolis et al. | 715/838 |
| 2001/0048534 | A1 | * | 12/2001 | Tanaka et al. | 358/1.16 |
| 2002/0027675 | A1 | * | 3/2002 | Minato | 358/1.15 |
| 2002/0054331 | A1 | * | 5/2002 | Takenobu et al. | 358/1.15 |
| 2002/0087573 | A1 | * | 7/2002 | Reuning et al. | 707/102 |
| 2002/0087622 | A1 | * | 7/2002 | Anderson | 709/203 |
| 2002/0093678 | A1 | * | 7/2002 | Skidgel et al. | 358/1.15 |
| 2002/0169688 | A1 | * | 11/2002 | Kasai | 705/26 |
| 2003/0164989 | A1 | * | 9/2003 | Yajima | 358/402 |
| 2003/0236709 | A1 | * | 12/2003 | Hendra et al. | 705/26 |
| 2004/0004737 | A1 | * | 1/2004 | Kahn et al. | 358/1.15 |
| 2004/0160623 | A1 | * | 8/2004 | Strittmatter et al. | 358/1.15 |
| 2005/0050043 | A1 | * | 3/2005 | Pyhalammi et al. | 707/6 |
| 2005/0144221 | A1 | * | 6/2005 | Shin et al. | 709/203 |
| 2006/0181736 | A1 | * | 8/2006 | Quek et al. | 358/1.18 |

OTHER PUBLICATIONS www.shutterfly.com, 1994.
www.ophoto.com, 1999.
Microsoft's World Wide Media Exchange (WWME) http://www.extremetech.com/article2/0,3973,1518753,00.asp and http://www.wwmx.org/, 2004.

* cited by examiner

*Primary Examiner* — Lin Ye
*Assistant Examiner* — Euel Cowan

(57) ABSTRACT

A system and method for image sharing is disclosed. The method of the present invention discloses: receiving a set of images and a transmit images command in response to the transmit images command; selecting a subset of the images in response to the transmit images command; formatting the subset of images in response to the transmit images command; and transmitting the formatted images to a recipient in response to the transmit images command. The system of the present invention discloses means for performing the method.

26 Claims, 4 Drawing Sheets

SYSTEM AND METHOD FOR IMAGE SHARING

BACKGROUND OF THE INVENTION

1. Field of the Invention

The present invention relates generally to systems and methods for image management, and more particularly to for image sharing.

2. Discussion of Background Art

Communicating product information, recording conference events, sharing experiences, vacations, memories, and the like through photos essays are often very succinct ways of communicating a significant amount of information in a relatively compact format. However, while taking pictures can be quite straightforward, systems and methods for getting such pictures in the hands of their intended recipients is rather awkward, requiring substantial manual user intervention that often adds a relatively long delay between when a picture is taken and when the intended recipient views it.

Currently, if a user takes pictures to send to another, the user must connect their camera, or flash memory, to a computer or printer, transfer the images to the device, manually organize the pictures (often this step is skipped due to the time involved), manually select a set of organized pictures to be sent to the other person, and then manually select how those pictures are to be rendered.

Each of these manually directed steps, while permitting a certain amount of discretion and flexibility, nonetheless can be so laborious that users often skip some steps or avoid sending photos at all, preferring instead to verbally describe their information by phone.

In response to the concerns discussed above, what is needed is a system and method for image management that overcomes the problems of the prior art.

SUMMARY OF THE INVENTION

The present invention is a system and method for image sharing. The method of the present invention includes: receiving a set of images and a transmit images command in response to the transmit images command; selecting a subset of the images in response to the transmit images command; formatting the subset of images in response to the transmit images command; and transmitting the formatted images to a recipient in response to the transmit images command.

The system of the present invention includes all means for performing the method.

These and other aspects of the invention will be recognized by those skilled in the art upon review of the detailed description, drawings, and claims set forth below.

DETAILED DESCRIPTION OF THE PREFERRED EMBODIMENT

The present invention is a complete "end-to-end" system for automatically or even spontaneously capturing, vaulting, clustering, transmitting, and rendering a user's photo or image logs, herein both defined as a plogs. The present invention eliminates many, if not all, of the manual steps users are currently tasked with by using current photo management systems and methods. No conscious effort or real-time decisions are required by a user who is capturing a set of photos or other images in order to have such images organized, laid out and transmitted to one or more intended recipients.

In one embodiment, the present invention can automatically create and deliver personalized plog renderings, complete with descriptive metadata, directly to a recipient's e-mail box, printer, or other destination. Such renderings are herein defined as plogcards.

For instance, using the present invention, a user can transmit a vignette of images directly from a cell phone camera to another's printer in a postcard format. The present invention automatically clusters the captured images according to a set of clustering criteria, before generating a plogcard which selectively includes various metadata and advertisements with the set of images.

Figure 1:
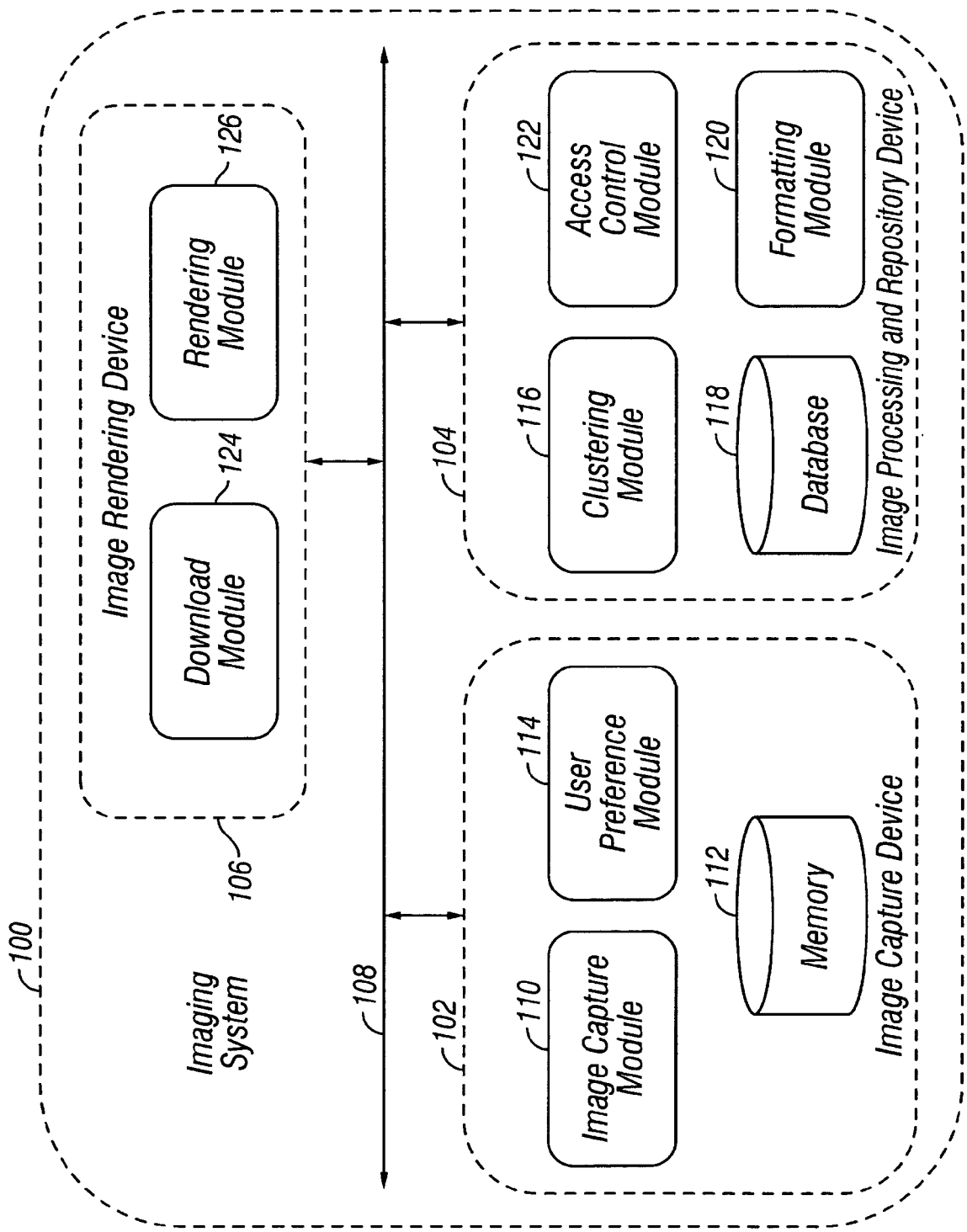
FIG. 1 is a dataflow diagram of one embodiment of a system for image sharing.

FIG. 1 is a dataflow diagram of one embodiment of a system 100 for image sharing. The imaging system 100 includes an image capture device 102, an image processing and repository device 104, and an image rendering device 106 each in communication over a network 108.

The network 108 will typically include a variety of communication links. For instance between the image capture device 102 and image processing and repository device 104 the network could be a cellular link, while between the image processing and repository device 104 and the image rendering device 106 could be an internet link. Other intermediary devices and services may also facilitate communication over the network 108 such as a wireless network, a Bluetooth service, or a telecom service. In some instance of the present invention where the functionality within the image processing and repository device 104 is assimilated by perhaps both image capture device 102 and the image processing and repository device 104 (e.g. a camera hooked directly to a printer) the network 108 might be a short one meter cable.

To follow is a discussion of the present invention's functionality as distributed between three hardware devices 102, 104, and 106. Those skilled in the art will recognize that in alternate embodiments of the present invention, some or all of this functionality may be located in only one device, or distributed over many devices.

To begin, the image capture device 102 captures a set of images and contemporaneous image metadata, using an image capture module 110, which is then stored in memory 112. The image metadata is either captured in real time (e.g. time and location metadata), using various sensors and timers, or if less variable (e.g. author, title, or annotation metadata), retrieved from memory 112. While the image capture device 102 is preferably a camera cell phone, in alternate embodiments digital cameras, digital scanners, handheld computers, and other capture devices work as well.

A user preference module 114, within the image capture device 102, solicits a plogcard author, a plogcard title, and a set of plogcard annotations. This information can be either in whole or in part supplied by the user in real-time or retrievable from memory 112.

The user preference module 114 solicits a set of plogcard delivery criteria for directing how the plogcards are to be processed and transmitted to recipients. Various embodiments of the present invention permit the user to specify either: what type of plogcard is to be generated (e.g. a postcard, a slide show, etc.); which set of images and metadata are to be included within the plogcard; how the set of images and metadata are to be clustered for the plogcard; a set of recipients to whom the plogcards are to be delivered or permitted access to (i.e. access control); or how the plogcards are to be delivered (e.g. e-mail, to a printer, etc.). If an embodiment of the present invention does not permit the image capture device 102 to specify one or more of these criteria, then such functionality is instead included within either the image processing and repository device 104 or the image rendering device 106 as previously indicated.

In one embodiment, the image capture device 102 specifies in real time only which set of images and metadata are to be included within the plogcard, and a set of recipients. All of the other specifications are preferably defined based on a service contract the user has with one or more service providers who charge various fees for generating different types of plogcards, clustering the set of images and metadata, and how the plogcards are to be formatted and delivered.

This information also can be either in whole or in part supplied by the user in real-time or retrievable from memory 112. For instance, the user may have preprogrammed in memory that all of the user's plogcards are to be rendered as postcard, and similarly, the user may have preprogrammed in memory that the set of recipients include all those contacts within a particular cell phone contact folder.

In response to a transmit images command, the image capture device 102 transmits a set of information (i.e. the set of images, metadata, user preference data, and criteria) over the network 108 to the image processing and repository device 104. The transmit images command is preferably a single button press received from the user of the image capture device 102.

The image processing and repository device 104 includes various fuinctional modules and devices for clustering, formatting, storing, and permitting access to the plogcards. The image processing and repository device 104 may include one or more computers having various digital archiving and web hosting capabilities.

The image processing and repository device 104 receives the uploaded information from the image capture device 102 and stores the information in a database 118. However, in an alternate embodiment, instead of passively waiting for images to be sent from the image capture device 102, the image processing and repository device 104 actively searches the network 108 for a predefined set of images. For example, the image processing and repository device 104 could be programmed to search the network for all images currently at a particular web address (i.e. URL) and download those images. Or the image processing and repository device 104 could get a message from a user directing the image processing and repository device 104 that a new set of images are ready for uploading at a particular network 108 address.

A clustering module 116, within the image processing and repository device 104, uses a set of clustering criteria to select a set of images (i.e. a vignette) and metadata from the database 118 for the plogcard. Preferably the clustering criteria is predefined within the image processing and repository device 104 based on a service agreement (see previous discussion). However, in an alternate embodiment, the clustering criteria is included within the user preference data transmitted from the image capture device 102.

The clustering criteria selects the images and metadata based on one or more temporal sorting and metadata attribution algorithms. For example, the clustering criteria may direct the clustering module 116 to sort the images based on time and then select those images recorded within a single day, or other time period. Another set of clustering criteria selects and sorts the images by one of the metadata attributes, such as author, title, location, annotation, etc. so that perhaps all images from a particular business trip or vacation can be clustered together. In a preferred embodiment, a simple "daily" clustering algorithm is used, where all pictures taken on a same day are part of a cluster so that a user can send a "daily postcard" to their friends, family, or others to keep in touch in a very personal and convenient way while on vacation.

A formatting module 120, within the image processing and repository device 104, uses a set of formatting criteria to arrange the set of images and metadata on the plogcard. Preferably the formatting criteria is predefined within the image processing and repository device 104 based on a service agreement (see previous discussion). However, in an alternate embodiment, the formatting criteria is included within the user preference data transmitted from the image capture device 102 or within a set of recipient preference data transmitted from the image rendering device 106. In this way, control over the plogcard format can be flexibly delegated to either the user, the image processing and repository device 104, the recipient, or some combination of the three parties based on various service agreements each has with the other.

The formatting criteria arranges the images, metadata, and any additional information (e.g. advertising) into one or more plogcard types (e.g. a postcard, a slide show, an e-mail, etc.) using either fixed templates, a best-fit algorithm (i.e. divide the plogcard space up by the number of images to create a grid of slots; place the images in each slot; and scale to fit), or some other layout algorithm. Advertisements added to plogcards by the formatting module 120 may enable some plogcard embodiments to be transmitted to recipients or rendered free of charge.

Figure 2:
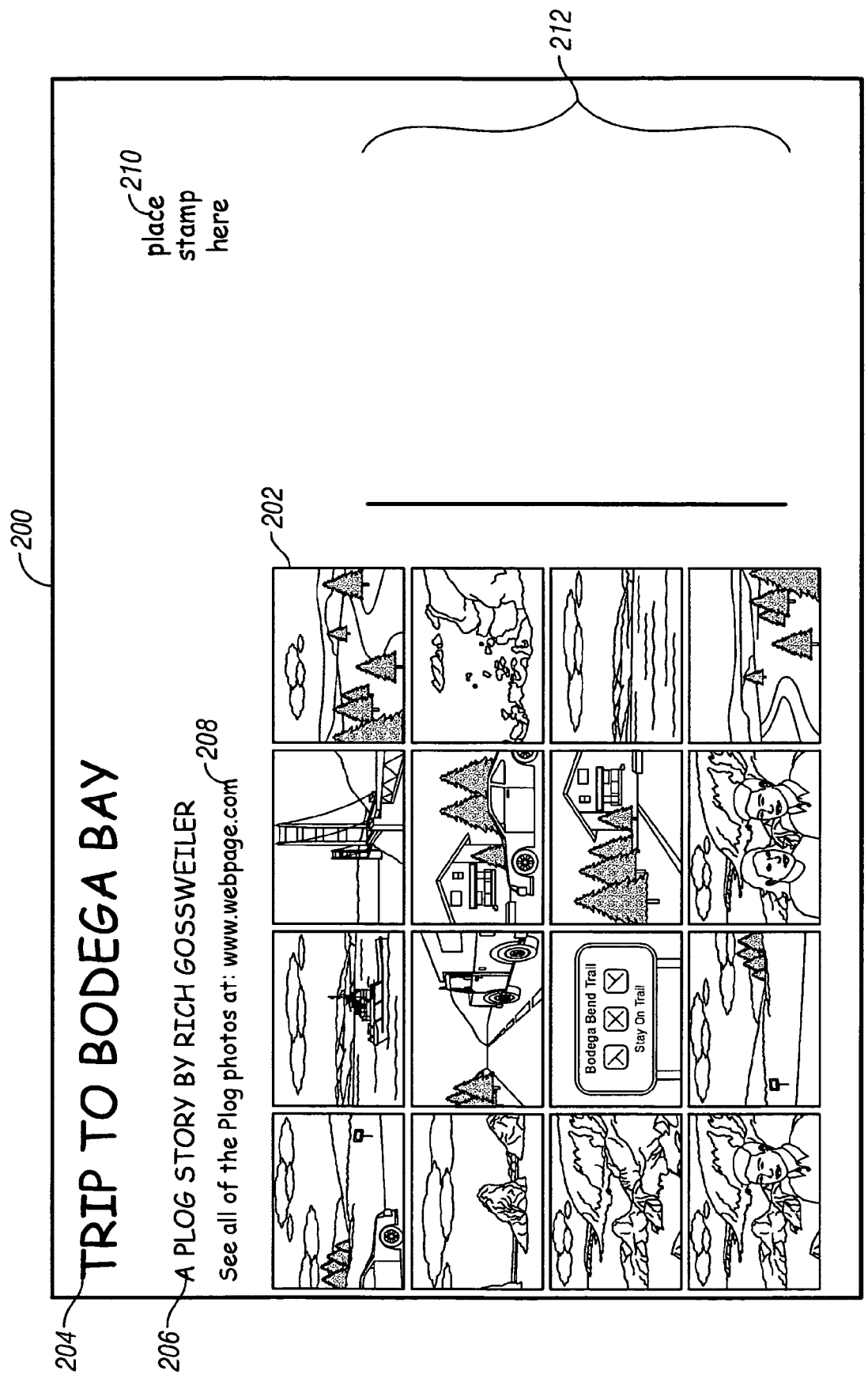
FIG. 2 is a pictorial diagram of one embodiment of a photo postcard created by the system.

FIG. 2 is a pictorial diagram of one embodiment of a photo postcard 200 created by the system 100 and formatted by the formatting module 120. In this example embodiment, the plogcard 200 resembles a postcard. The plogcard 200 includes: a vignette of one day's images 202 arranged using a best-fit algorithm; a title 204 retrieved from the image metadata sent by the image capture module 102; a byline or author's name 206 also retrieved from the image metadata; a URL to the author's plog website 208 which may either have been retrieved from the image metadata or correspond to a network address from which the image processing and repository device 104 retrieved the uploaded image information; a stamp field 210 which in other embodiments may be configured to resemble a faux stamp of a corporate or service provider logo; and an address field 212 which in an alternate embodiment may be replaced with an advertisement. In the plogcard 200 shown, all of the information has been placed on one side, thereby allowing the recipient to enjoy all of the plogcard 200 information without having to turn the plogcard over. In alternate embodiments dates of creation, location information, watermarks, background images, and other annotations may also be included in the plogcard 200.

An access control module 122, within the image processing and repository device 104, uses a set of access control criteria to control delivery of the plogcard to various recipients. Preferably the access control criteria is predefined within the user preference data generated by the image capture module 102. However, in other embodiments of the present invention, the access control criteria can be based on a service agreement which either the user or one or more recipients has with the image processing and repository device 104 service provider. Delivery to various recipients may be either active or passive. With an active delivery service, the access control module 122 sends a plogcard to a recipient's image rendering device 106 without requiring a request from the recipient. With a passive delivery service, the access control module 122 only sends the plogcard to the recipient's image rendering device 106 if the recipient has requested the plogcard. In a preferred embodiment, the user designates the set of recipients from within the user's cell phone address book and the access control module 122 actively sends the plogcard to those designated recipients.

Actual transmission of the plogcards may be effected through any media conduit, such as electronically over the internet or physically using regular postal mails. Note that if a physical shipping option is selected, the plogcard must be rendered prior to shipping. Physical shipping may be preferred when control over the plogcard's quality is desired, such as to ensure that the plogcard is printed on only high-quality glossy card stock.

A download module 124 within the image rendering device 106 receives one or more plogcards transmitted from the access control module 122. If the plogcard were passively delivered, the download module 124 would have previously requested their transmission. A rendering module 126 within the image rendering device 106 renders the plogcard. Rendering can be either digital, such as on a display screen, transmitted to a handheld computer, into an e-mail in-box, or etc., or physically such as on paper from a printer. Depending upon the system's 100 embodiment, the rendering module 126 may or may not have some control over the plogcard's format and how the plogcard is rendered. For example, in one embodiment, the image rendering device 106 receives the plogcard but can not adjust the plogcard's format, and can only print the plogcard to a printer. However, in another embodiment, the recipient can use the rendering module 126 to request additional images and metadata from the image processing and repository device 104 and can rearrange the images or even the type of plogcard generated. Preferably the plogcard is rendered as a postcard which can either be digitally viewed or printed.

Figure 3:
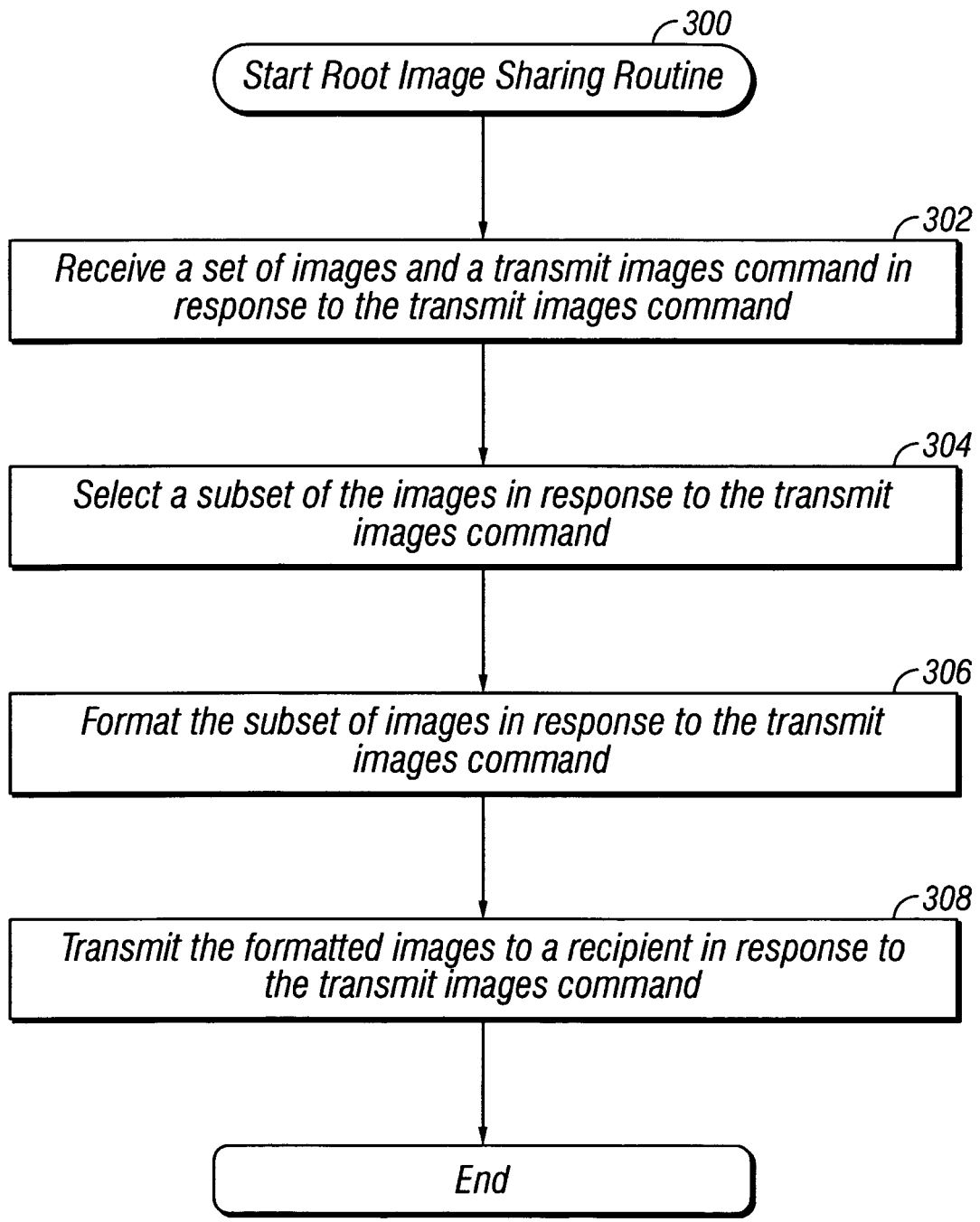
FIG. 3 is a flowchart of one embodiment of a root method for image sharing.

FIG. 3 is a flowchart of one embodiment of a root method 300 for image sharing. In step 302, the image processing and repository device 104 receives a set of images and a transmit images command from the image capture device 102 in response to the user selecting the transmit images command on the image capture device 102. In step 304, the clustering module 116 selects a subset of the images in response to the transmit images command selected by the user. In step 306, the formatting module 120 formats the subset of images in response to the transmit images command selected by the user. Then in step 308, the access control module 122 transmits the formatted images to a recipient at the image rendering device 106 in response to the transmit images command selected by the user. Thus the user need only issue one transmit images command for this entire end-to-end set of steps to be automatically effected. The root method 300 is discussed in further detail with respect to FIG. 4.

Figure 4:
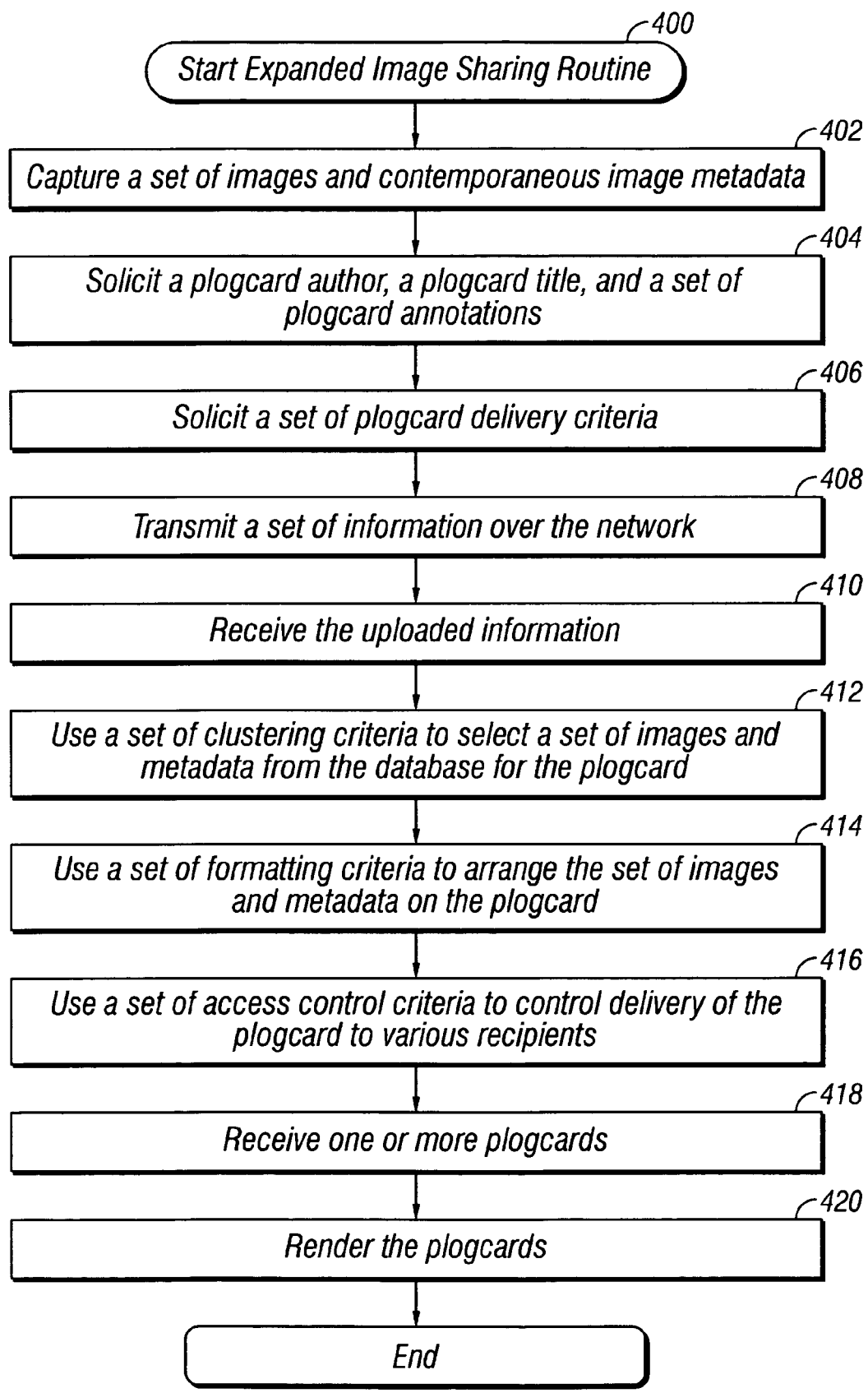
FIG. 4 is a flowchart of one expanded embodiment of the root method.

FIG. 4 is a flowchart of one expanded embodiment 400 of the root method 300. To begin, in step 402, the image capture device 102 captures a set of images and contemporaneous image metadata, using an image capture module 110, which is then stored in memory 112. In step 404, a user preference module 114, within the image capture device 102, solicits a plogcard author, a plogcard title, and a set of plogcard annotations. In step 406, the user preference module 114 solicits a set of plogcard delivery criteria for directing how the plogcards are to be processed and transmitted to recipients.

In step 408, in response to a transmit images command, the image capture device 102 transmits a set of information over the network 108 to the image processing and repository device 104. In step 410, the image processing and repository device 104 receives the uploaded information from the image capture device 102 and stores the information in a database 118.

In step 412, a clustering module 116, within the image processing and repository device 104, uses a set of clustering criteria to select a set of images and metadata from the database 118 for the plogcard. In step 414, a formatting module 120, within the image processing and repository device 104, uses a set of formatting criteria to arrange the set of images and metadata on the plogcard. In step 416, an access control module 122, within the image processing and repository device 104, uses a set of access control criteria to control delivery of the plogcard to various recipients.

In step 418, a download module 124 within the image rendering device 106 receives one or more plogcards transmitted from the access control module 122. In step 420, a rendering module 126 within the image rendering device 106 renders the plogcard.

While one or more embodiments of the present invention have been described, those skilled in the art will recognize that various modifications may be made. Variations upon and modifications to these embodiments are provided by the present invention, which is limited only by the following claims.

What is claimed is:

1. A method for image sharing, comprising:
capturing images with an image capturing device;
activating a single button on the image capturing device to transmit the images and a transmit images command over a network to an image processing device;
receiving the images and the transmit images command at the image processing device;
in response to receiving the transmit images command and stored user preferences from the image capturing device upon activation of the single button, the image processing device automatically performing steps that include:
selecting a subset of the images;
formatting the subset of images; and
transmitting the formatted images to a recipient.

2. The method of claim 1, wherein the stored user preferences specify to transmit an image of the subset of images to the recipient as a postcard.

3. The method of claim 1, wherein the image processing device automatically sorts the subset of images based on a time when the images are recorded and selects an image that is transmitted as a daily postcard to the recipient.

4. The method of claim 1, wherein the stored user preferences specify an arrangement of an advertisement on an image of the subset of images that is transmitted to the recipient.

5. The method of claim 1, wherein:
receiving includes receiving a set of time metadata indicating when each image was captured; and
selecting includes selecting images captured within a predetermined range of times.

6. The method of claim 1, wherein the stored user preferences specify a title that is automatically placed on an image that is transmitted to the recipient.

7. The method of claim 1, wherein:
receiving includes receiving a set of location metadata indicating where each image was captured; and
selecting includes selecting images captured at a predetermined set of locations.

8. The method of claim 1, wherein:
receiving includes receiving a set of title metadata labeling the images;

selecting includes selecting images labeled with a predetermined title; and wherein formatting includes combining the title with the images.

9. The method of claim 1, wherein:

receiving includes receiving a set of author metadata labeling the images;

selecting includes selecting images labeled with a predetermined author; and wherein formatting includes combining the author with the images.

10. The method of claim 1:

wherein formatting includes formatting the images in a postcard format.

11. The method of claim 10, wherein formatting includes:

dividing the postcard up by a number of the images;

creating a grid of slots at each divided portion of the postcard;

placing the images in each slot; and scaling the image to fit within each slot.

12. The method of claim 1:

wherein formatting includes combining an advertisement with the images.

13. The method of claim 1, wherein the stored user preferences automatically place a location where an image is recorded on the image and transmit the image to the recipient.

14. The method of claim 1:

wherein formatting includes combining a faux stamp with the images.

15. The method of claim 1, further comprising:

rendering the formatted images in an e-mail in response to the transmit images command.

16. The method of claim 1, further comprising:

rendering the formatted images on a printer in response to the transmit images command.

17. The method of claim 1, further comprising:

using a third party to perform the selecting, formatting, and transmitting; and performing the selecting, formatting, and transmitting according to predetermined criteria within a service contract between a user who is capturing the images and the third party.

18. A method for image sharing, comprising:

capturing images with an image capturing device;

issuing a single transmit images command from the image capturing device over a network to an image processing device to cause the image processing device to automatically perform steps that include:

downloading the images from a location on the network;

selecting a subset of the images based on a set of clustering criteria stored in the image processing device;

formatting the subset of images into a predetermined layout based on user preferences stored in the image processing device; and transmitting the formatted images to a list of recipients stored in the image capturing device.

19. A method for image sharing, comprising:

capturing images with a camera cellphone;

using a single activation on the cellphone to generate a single transmit images command that is transmitted to an image processing device;

in response to receiving the single transmit images command, the image processing device automatically performing steps that include:

retrieving the images from the cellphone;

selecting a subset of the images based on when in time the images were captured;

formatting the subset of images in a postcard format; and transmitting the formatted images to a recipient identified from a contact folder within the cellphone.

20. A method for sharing images captured with a portable image capturing device, comprising:

capturing images with the image capturing device;

activating a single button on the image capturing device to transmit the images and a transmit images command over a network to an image processing device;

receiving the images and the transmit images command at the image processing device;

in response to receiving the transmit images command and stored user preferences, the image processing device automatically performing steps that include:

selecting a subset of the images;

formatting the subset of images; and transmitting the formatted images to a recipient.

21. The method of claim 20, wherein:

receiving includes receiving a set of time metadata indicating when each image was captured; and selecting includes selecting images captured within a predetermined range of times.

22. The method of claim 21, wherein:

selecting includes selecting images captured within a single day; and transmitting includes transmitting the images each day.

23. The method of claim 20, wherein:

receiving includes receiving a set of location metadata indicating where each image was captured; and selecting includes selecting images captured at a predetermined set of locations.

24. The method of claim 20, wherein:

receiving includes receiving a set of title metadata labeling the images;

selecting includes selecting images labeled with a predetermined title; and wherein formatting includes combining the title with the images.

25. The method of claim 20, wherein:

receiving includes receiving a set of author metadata labeling the images;

selecting includes selecting images labeled with a predetermined author; and wherein formatting includes combining the author with the images.

26. A system for image sharing, comprising a:

means for capturing images;

means for activating the means for capturing images to transmit images and a single transmit images command over a network to a means for image processing;

means for receiving the images and the single transmit images command at the means for image processing;

in response to receiving only the single transmit images command, the means for image processing automatically performing each step that includes:

selecting a subset of the images based on a time when the images were captured;

formatting the subset of images in accordance with a stored user preference; and transmitting the formatted images to a recipient designed by a user of the means for capturing images.

* * * * *